US012756433B2

(12) United States Patent
Gupta et al.

(10) Patent No.: US 12,756,433 B2
(45) Date of Patent: Oct. 6, 2026

(54) SYSTEM AND DESIGN METHOD OF ANTENNA FILTER UNIT (AFU) OF A MASSIVE MIMO RADIO UNIT

(71) Applicant: JIO PLATFORMS LIMITED, Ahmedabad (IN)

(72) Inventors: Deepak Gupta, Navi Mumbai (IN); Nekiram Khosya, Dombivali (IN); Amrish Bansal, Navi Mumbai (IN); Brijesh Shah, Navi Mumbai (IN); Renuka Nair, Dombivali (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 223 days.

(21) Appl. No.: 18/247,462

(22) PCT Filed: Mar. 11, 2023

(86) PCT No.: PCT/IB2023/052344
§ 371 (c)(1),
(2) Date: Mar. 31, 2023

(87) PCT Pub. No.: WO2023/187513
PCT Pub. Date: Oct. 5, 2023

(65) Prior Publication Data

US 2025/0015845 A1 Jan. 9, 2025

(30) Foreign Application Priority Data

Mar. 29, 2022 (IN) ............................ 202221018409

(51) Int. Cl.
*H04L 1/02* (2006.01)
*H04B 7/0452* (2017.01)
*H04B 7/0456* (2017.01)

(52) U.S. Cl.
CPC ......... *H04B 7/0452* (2013.01); *H04B 7/0456* (2013.01)

(58) Field of Classification Search
CPC ....... H04L 1/0618; H04L 1/06; H04L 7/0087; H04B 7/0417; H04B 7/0404; H04B 7/0413
USPC ................................ 375/267, 260, 262, 299
See application file for complete search history.

(56) References Cited

U.S. PATENT DOCUMENTS

| | | | | |
|---|---|---|---|---|
| 10,056,922 | B1 | 8/2018 | Tsvelykh et al. | |
| 12,046,813 | B2 * | 7/2024 | Zhang | H01Q 19/10 |
| 2010/0238075 | A1 | 9/2010 | Pourseyed | |
| 2012/0208473 | A1 | 8/2012 | Aparin | |
| 2017/0063002 | A1 * | 3/2017 | Daughtry | H01R 12/722 |

(Continued)

FOREIGN PATENT DOCUMENTS

CN 204258802 U 4/2015

OTHER PUBLICATIONS

International Search Report, PCT/IB2023/052344, mailed Jun. 15, 2023, Total pp. 03.

*Primary Examiner* — Khai Tran
(74) *Attorney, Agent, or Firm* — FINNEGAN, HENDERSON, FARABOW, GARRETT & DUNNER LLP

(57) ABSTRACT

The present disclosure relates to an antenna filter unit (AFU) (280) communicatively coupled to a Radio Frequency (RF) Front End Module (RFEM) (250). The AFU (280) comprises a plurality of cavity filters and a Multiple-Input-Multiple-Output (MIMO) antenna unit to enable beam forming to multiple users.

7 Claims, 3 Drawing Sheets

(56) References Cited

U.S. PATENT DOCUMENTS

| | | | | |
|---|---|---|---|---|
| 2018/0091203 | A1* | 3/2018 | Kufer | G01S 7/42 |
| 2022/0191761 | A1* | 6/2022 | Feng | G06F 9/4451 |
| 2023/0074376 | A1* | 3/2023 | Valdes Garcia | H01Q 21/0025 |
| 2023/0096000 | A1* | 3/2023 | Yoon | H03H 9/542<br>375/267 |
| 2023/0101089 | A1* | 3/2023 | Cui | H04W 52/146<br>455/522 |
| 2023/0108020 | A1* | 4/2023 | Kim | H01P 1/2053<br>343/853 |
| 2023/0155636 | A1* | 5/2023 | Jeon | H01Q 21/28<br>375/267 |
| 2024/0063522 | A1* | 2/2024 | Sun | H01P 1/2053 |
| 2024/0128650 | A1* | 4/2024 | Zhang | H01Q 1/246 |
| 2025/0023235 | A1* | 1/2025 | Song | H01P 1/18 |

* cited by examiner

SYSTEM AND DESIGN METHOD OF ANTENNA FILTER UNIT (AFU) OF A MASSIVE MIMO RADIO UNIT

FIELD OF INVENTION

The present disclosure relates generally to network devices, and more particularly to design and architecture of an antenna filter unit (AFU) of a massive multiple-input multiple-output (MIMO) radio unit.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

5G communication system is considered to be implemented in Sub-6 GHZ and higher frequency (millimeter (mm) Wave) bands, e.g., 60 gigahertz (GHz) bands, so as to accomplish higher data rates. To decrease propagation loss of the radio waves and increase transmission distance, beam forming, massive multiple-input multiple-output (MIMO), Full Dimensional MIMO (FD-MIMO), array antenna, analog beam forming, and large scale antenna techniques are discussed for use in 5G communication systems.

Conventional antenna filter units are incapable of multi-pass band and various stopband processing capabilities. Finding the optimal balance of radio frequency (RF) components that utilize high performance capacities with a uniquely wide operational bandwidth is challenging. Further, conventional antenna filter units are bulky and require high power for operation. Traditionally, cable assemblies are used for signal transmission in conventional antenna filters. However, quality and performance requirement associated with the cable assemblies is also very high and needs larger space for operation.

There is, therefore, a need in the art to provide a system and a method that can mitigate the problems associated with the prior arts.

SUMMARY

In an aspect, the present disclosure relates to an antenna filter unit (AFU) operatively coupled with a radio frequency front end module (RFEM). The AFU may include a plurality of cavity filters and a Multiple-Input-Multiple-Output (MIMO) antenna unit to enable beam forming to multiple users.

In an embodiment, the AFU may further include a calibration Printed Circuit Board (PCB).

In an embodiment, the AFU maybe blind mated with the RFEM.

In an embodiment, the AFU and the RFEM may be configured on a high speed transceiver board (HSTB) along with a transmission line that is connected between two connectors as a pole. The AFU may include one or more antenna ports as receiver and transmitter outputs.

In an embodiment, the AFU may include one or more antenna ports as receiver and transmitter outputs, where the one or more antenna ports may be connected to respective cavity filters to achieve 32T32R configuration that provides steeper roll-off outside operating band.

In an embodiment, the HSTB may include a plurality of transceivers. The digital signals received from Combined Central and Distributed Unit (CCDU) may be converted into RF signals and processed into analog signals using one or more converters to be transmitted to the RFEM.

In an embodiment, the RFEM may include one or more low noise amplifiers (LNAs) and a plurality of RF switches for transmit and receive chains to process the received analog signals and transmit output signals to the AFU.

In an embodiment, the HSTB may be placed in a metal housing having a covering on a bottom side, and where the AFU may be configured to be coupled to the metal housing from the bottom side, and where the metal housing may be an aluminium metal housing.

In an aspect, the present disclosure relates to a user equipment communicatively coupled to a MIMO radio unit. The user equipment may include one or more primary processors communicatively coupled to one or more processors of the MIMO radio unit through a network, the one or more primary processors coupled with a memory, where the memory stores instructions which when executed by the one or more primary processors causes the user equipment to transmit one or more radio frequency (RF) control signals to the MIMO radio unit, where an antenna filter unit (AFU) is communicatively coupled to the MIMO radio unit and configured with a plurality of cavity filters and a MIMO antenna unit to enable beam forming to multiple users, where the AFU is communicatively coupled to a radio frequency front end module (RFEM) in the MIMO radio unit.

In an aspect, the present disclosure relates to a non-transitory computer readable medium including processor-executable instructions that cause a processor to transmit one or more radio frequency (RF) control signals to a multiple input multiple output (MIMO) radio unit, wherein an antenna filter unit (AFU) is communicatively coupled to the MIMO radio unit and configured with a plurality of cavity filters and a MIMO antenna unit to enable beam forming to multiple users, wherein the AFU is communicatively coupled to a radio frequency front end module (RFEM) in the MIMO radio unit.

OBJECTS OF THE INVENTION

An object of the present invention is to provide higher spectral efficiency by allowing its antenna array to focus narrow beams towards a user.

An object of the present invention is to provide higher energy Efficiency system as the antenna array is focused in a small specific section, it requires less radiated power and reduces the energy requirement in massive MIMO systems.

An object of the present invention is to increase the data rate and capacity of wireless systems.

An object of the present invention is to facilitate more reliable and accurate user tracking.

An object of the present invention is to eliminate high Power Consumption.

An object of the present invention is to reduce the Latency and increases the reliability of the network.

An object of the present invention is to provide a cable less design of Massive MIMO radio unit.

An object of the present invention is provide a Massive MIMO standalone unit placed in a single convection cooled enclosure and weighing less than 25-29 kg.

An object of the present invention is to provide a Massive MIMO standalone unit that comprises of lower layer PHY section, ORAN compliant Fronthaul on 25G optical interface, Digital Front End support for 32 transmit and receive chains using commercial grade three FPGAs.

An object of the present invention is to provide a Massive MIMO standalone unit that includes Integrated 8×8 MIMO antenna with 32 Cavity filter as a one unit known as Antenna Filter Unit (AFU).

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
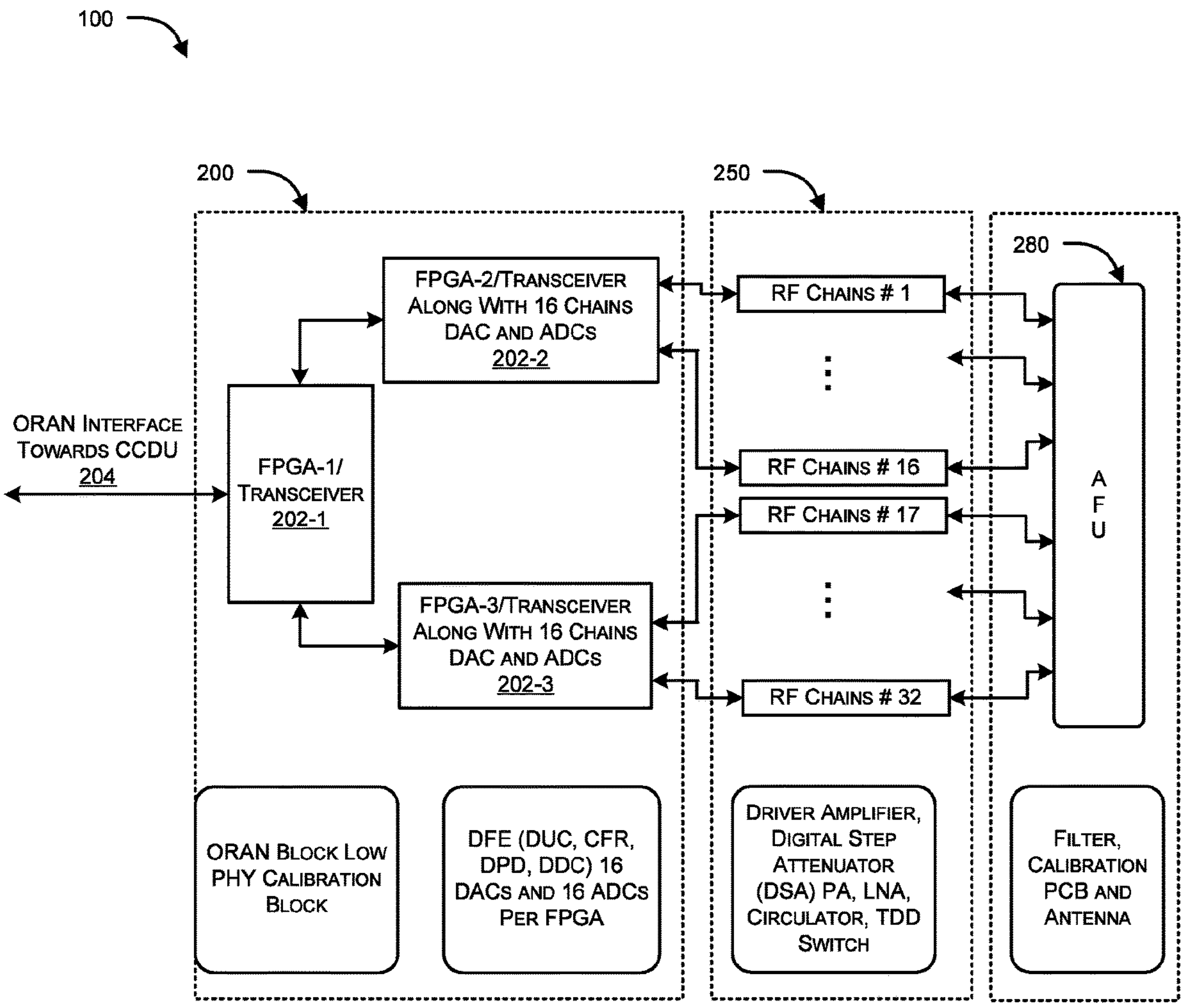
FIG. 1 illustrates an exemplary design architecture of a Massive MIMO Radio Unit in accordance with aspects of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the disclosure, various embodiments are described using terms used in some communication standards (e.g., 3rd Generation Partnership Project (3GPP), extensible radio access network (xRAN), and open-radio access network (O-RAN)), but these are merely examples for description. Various embodiments of the disclosure may also be easily modified and applied to other communication systems.

Typically, a base station is a network infrastructure that provides wireless access to one or more terminals. The base station has coverage defined to be a predetermined geographic area based on the distance over which a signal may be transmitted. The base station may be referred to as, in addition to "base station," "access point (AP)," "evolved NodeB (eNodeB) (eNB)," "5G node (5th generation node)," "next generation NodeB (gNB)," "wireless point," "transmission/reception point (TRP)," or other terms having equivalent technical meanings.

The present disclosure relates to an O-RAN (Open Radio Access Network) compliant 5G Massive MIMO Radio Unit (MRU) (alternatively and interchangeably also referred to as "5G MRU" or "RU" hereinafter). In an exemplary and non-limiting embodiment, the present disclosure provides, in an exemplary implementation, a hardware architecture and design of a multiple antenna configuration 32T32R (32 Transmitters and 32 Receivers) based 5G Massive MIMO Radio Unit (MRU) for standalone mode, wherein the proposed 5G MRU is a radio unit (RU) connected to a Combined Central and Distributed Unit (CCDU) on Fronthaul interface using 25G optical interface, and is compliant to 3GPP (Third Generation Partnership Project) based ORAN (Open Radio Access Network) specifications. The proposed MRU can be configured in a manner such that, in an exemplary implementation, there are three cell-cites and three (3) corresponding MRUs that are used with the CCDU, wherein each MRU can be connected to the CCDU through the 25G interface.

In an exemplary aspect, the proposed 5G MRU comprises a lower PHY (Physical) portion of L1 layer with network layer split of 7.2X (O-RAN Alliance fronthaul specification between O-DU to O-RRU), a baseband section, a RF (Radio Frequency) Front End module (RFEM), and an Antenna Filter Unit (AFU) as part of a single enclosure/unit for easy and efficient installation. It is however to be appreciated that design and architecture of each of the components/units of the proposed RU is novel and inventive as regards the instant disclosure is concerned, and hence each component and its structure/construction would be protected through a respective/separate patent application.

In an exemplary aspect, with respect to FIG. 1, the proposed 5G MRU 100 can include a High Speed Transceiver Board (HSTB) 200 having a lower layer PHY section, an ORAN compliant Fronthaul on 25G optical interface 204, and a digital RF front end support module (RFEM) having transmit and receive chains (32 chains in an exemplary instance) using, for example, commercial grade three FPGAs/transceivers (202-1 to 202-3, collectively referred to as 202 hereinafter), said elements/components being integrated on a highly dense multi-layer structure (for instance, 26 layers in an embodiment) of the HSTB 200. It would be appreciated that while the disclosure is being explained w.r.t a FPGA (Field Programmable Gate Arrays), any other equivalent transceiver is fully within the scope of the present disclosure, and therefore scope of each FPGA should be treated as that of any transceiver or technically equivalent component such as an ASIC (Application-Specific Integrated Circuit).

In an exemplary aspect, the L1 lower layer PHY development and bit stream generation can be implemented/undertaken in the FPGA202 itself. L1 higher layer can be configured on the CCDU (Communication and Capacity Development Unit) below the tower, wherein the L2 and L3 may be configured on the Distributed Unit (DU), wherein a macro-site typically includes a Central Unit Node (server side) and a Distributed Unit Node (configured between the CU (Centralized Unit) and RUs (Radio Units)). The present disclosure merges the Central Unit Node with the Distributed Unit Node so as to form a CCDU that interfaces through the 25G optical interface with the RUs/MRUs as proposed in the instant disclosure. The proposed MRU can further include an IEEE 1588v2 PTP based clock synchronization architecture on the 25G optical interface 204 using system synchronizer IC and clock generators.

The proposed MRU 100 can further include an Integrated 8×8 MIMO antenna with 32 cavity filter as a one unit known as Antenna Filter Unit (AFU) 280. The proposed MRU 100, as configured, can be blind mated and possess a cable less design.

In an exemplary and non-limiting aspect of the present disclosure, the proposed 5G MRU 100 is a 200 W high power gNB that operates in macro class (typically 6.25 W or 38 dBm per antenna port), and is configured to provide macro-level wide-area solutions for coverage and capacity that can find utility in Dense Urban morphologies and in hot zone/hot spot areas having high traffic and QoS demands. The proposed 5G MRU 100 can bring together a lower layer PHY section and a RF transceiver based on commercial grade FPGAs (as part of the HSTB 200) for 32 transmit and receive chains. The MRU 100 can further include a RF Front End Module (RFEM) 250 that can include a plurality of RF power amplifiers, low noise amplifiers (LNA), and RF switches for the 32 chains. The MRU can further include an 8*8 MIMO antenna along having a plurality of cavity filters (for instance, 32 filters) known as Antenna Filter Unit (AFU) 280 as part of a single convection cooled enclosure and weighing less than 25 kg. In an aspect, Macro gNB can provide good coverage and capacity for dense urban clutter owing to 8 beams in the downlink and 4 uplink beams support under multi-UE scenarios. The proposed 5G MRU 100 can be deployed at high rise buildings, dense clutters, and hotspot locations where traffic demand is significantly high and cannot be served by 4G gNB alone for coverage and capacity boosts.

In another aspect, the proposed 5G MRU can be configured as a design with integrated antenna and cavity filter solution without requiring use of cable, making it a cable less design. The proposed MRU 100 can be deployed in tower sites, GBTs and GBMs. The MRU can be deployed quickly so as to deliver high performance with low power consumption, making the MRU a power efficient solution. The proposed MRU can be connected to a CCDU below the tower on a single 25G optical front haul interface that is 3GPP ORAN compliant.

In an aspect, the proposed 5G MRU is a high power gNB (Next Generation Node B) that operates in macro class (typically ≤38 dBm per antenna port), and can be configured to complement macro-level wide-area solutions for coverage and capacity. In an exemplary aspect, high level architecture of the proposed 32T32R 5G NR MRU can include a High Speed Transceiver Board (HSTB) 200, a 32T32R RF Frond End Module (RFEM) Board 250, an Antenna Filter Unit (AFU) 280, and a mechanical housing (in an instance, there can be two housings, one for the HSTB 200 and one for the RFEM 250). The proposed MRU construction further facilitates and enables optimal heat dissipation owing to operation in weather conditions ranging from −10 degrees to 50 degrees C.

In an exemplary aspect, the proposed 5G NR MRU 100 brings together lower layer PHY section, RF transceiver based on commercial grade FPGAs for 32 transmit and receive chains with the RF sampling (No Intermediate Frequency stage) (as part of the HSTB 200), RF front end module (RFEM) 250 that includes RF power amplifiers, Low noise amplifiers (LNA), and RF switches for 32 chains, and 8*8 MIMO antenna along with 32 cavity filters known as Antenna Filter Unit (AFU) 350 in a single convection cooled enclosure and weighing≤29 kg.

In an exemplary implementation, the proposed MRU 100 comprises 64 connectors, 32 on each of transmit and receiver side, and two DC connectors, each connector having 25 pins, making it 50 pins across the two DC connectors. These connectors are configured on the HSTB 200 in manner such that they blindly connect/map/mate/sandwich with the RFEM board 250, one on top of the other.

In an aspect, the proposed design architecture comprises of a control plane, user plane, and a synchronization plane, wherein the control plane is configured to control the configuration of the units/sub-units that form part of the proposed MRU 100 from a distance-place perspective, and wherein the user plane comprises of the user data, and finally wherein the synchronization plane is configured to utilize precision time-based protocol (PTP) on the instant 25G interface so as to synchronize the unit/sub-units with respect to a global clock using a timing protocol (i.e. the slave device would sync its clock with the master device in terms of the phase and the frequency), and maintain consistency/sync with the CCDU.

It would be appreciated that the proposed MRU meets all the RF performance requirements after integrating TDD based 5G NR MRU with Crest Factor Reduction (CFR) and digital pre-distortion (DPD) modules in digital front end lineup. Furthermore, the MRU has low power consumption and thermally handled optimally by the IP65 ingress protected mechanical housing.

Antenna Filter Unit (AFU) 280

Figure 2:
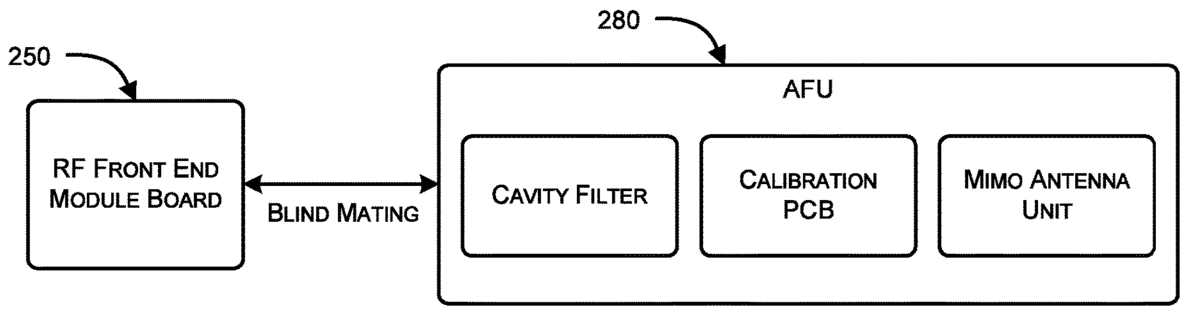
FIG. 2 illustrates an exemplary design architecture of an Antenna Filter Unit (AFU) in accordance with aspects of the present disclosure.

FIG. 2 illustrates an exemplary design architecture of an Antenna Filter Unit (AFU), in accordance with aspects of the present disclosure.

In an exemplary aspect, the proposed AFU comprises a cavity filter and an 8*8 MIMO (128 Single antenna elements) antenna unit with calibration PCB in one integrated unit known as the AFU, which is blind mated with the RFEB and is configured to enable beam forming to the multi-user MIMO. The AFU, in an exemplary implementation/design, can be configured to be coupled to the housing from below, wherein the board would be placed in an aluminium metal housing having a covering on the bottom side. In an aspect, the AFU and the RFEB would be configured on the HSTB along a transmission line which is cylindrical in shape from both the sides which would be connected between two connectors like a pole so that there are two receptacles and between that a pillar is configured that would connect these units/sub-units.

The proposed AFU can include a 32-port (32 antenna ports as receiver and transmitted are coming to the same antenna port, wherein the 32 ports would be connected to corresponding/respective 32 cavity filters) cavity filter for 32T3R configuration that provides steeper roll-off outside operating band. The proposed AFU enables unique radiation pattern, low loss, and low interference.

In an aspect, the proposed MRU is able to achieve system noise figure levels of 3.5-3.6 dB owing to the design and layout of the MRU architecture and reduction in the amount of the losses and the number of cables and enabling blind-mating.

Figure 3:
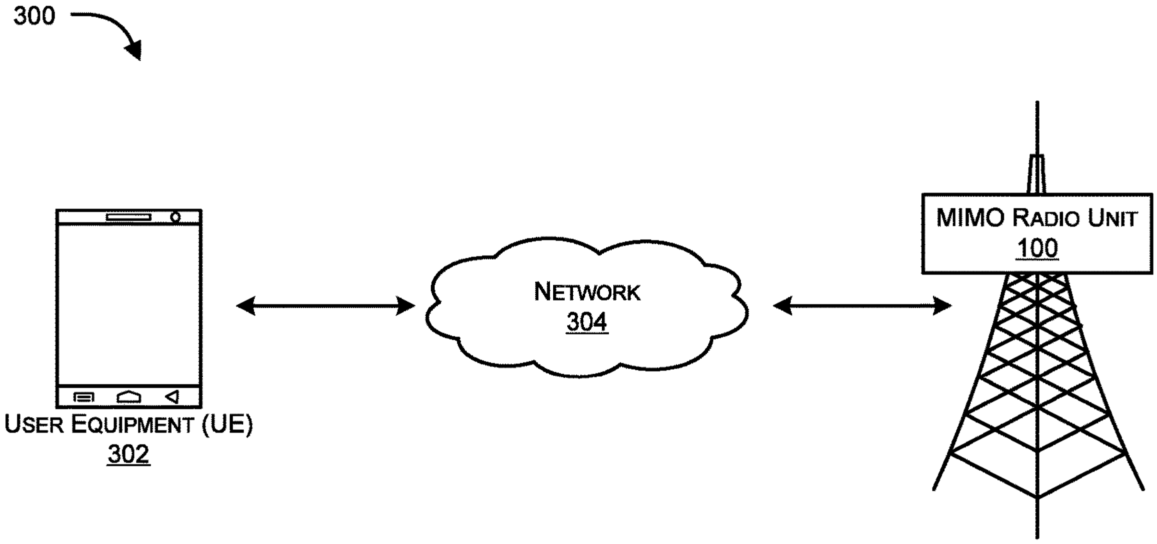
FIG. 3 illustrates an exemplary coupling representation of a user equipment (UE) with the MIMO radio unit in accordance with aspects of the present disclosure.

FIG. 3 illustrates an exemplary coupling representation of a user equipment (UE) with the MRU. As illustrated, the UE 302 may be communicatively coupled to the MRU 100. The coupling can be through a wireless network 304. In an exemplary embodiment, the communication network 304 may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The UE 302 can be any handheld device, mobile device, palmtop, laptop, smart phone, pager and the like. As a result of the coupling, the UE 302 may be configured to receive a connection request from the MRU 100, send an acknowledgment of connection request to the MRU 100 and further transmit a plurality of signals in response to the connection request.

Exemplary Computer System 400

Figure 4:
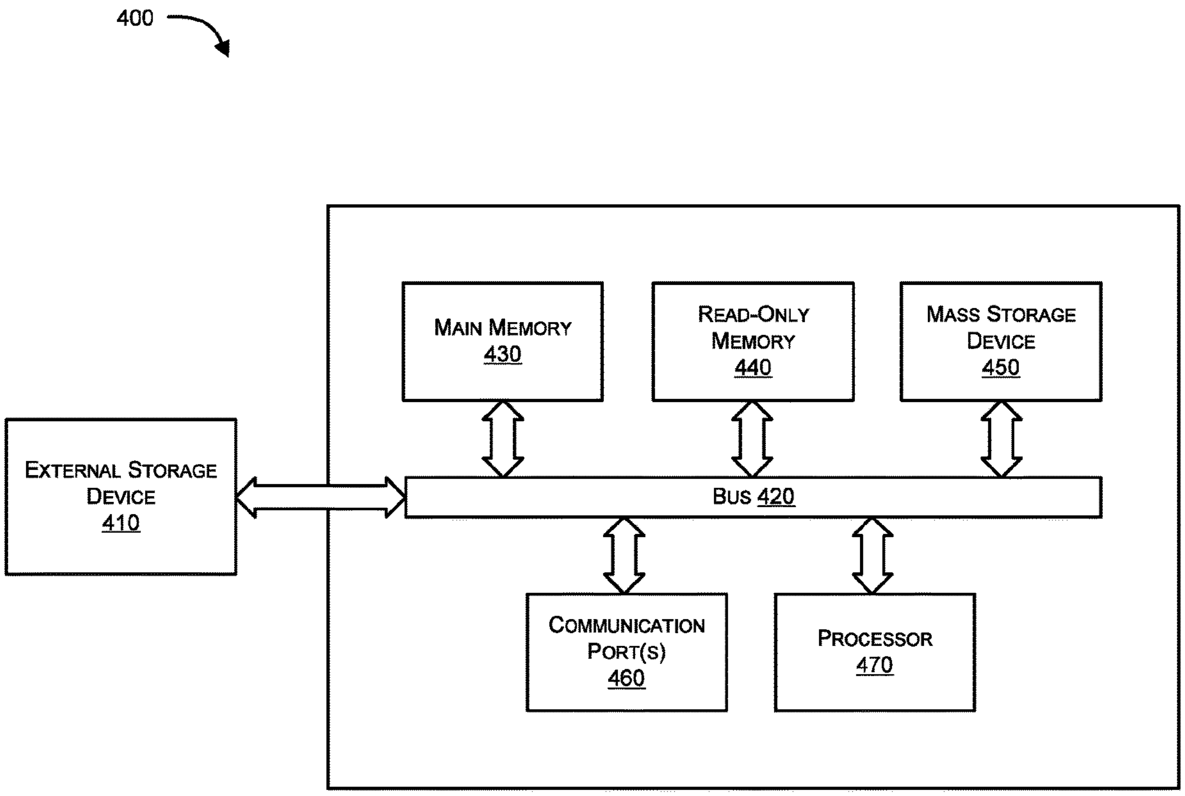
FIG. 4 illustrates an exemplary computer system in which or with which embodiments of the present invention can be utilized in accordance with embodiments of the present disclosure.

FIG. 4 illustrates an exemplary computer system in which or with which embodiments of the present invention can be utilized in accordance with embodiments of the present disclosure. As shown in FIG. 4, computer system 400 can include an external storage device 410, a bus 420, a main memory 430, a read only memory $40, a mass storage device 450, communication port 460, and a processor 470. A person skilled in the art will appreciate that the computer system may include more than one processor and communication ports. Processor 470 may include various modules associated with embodiments of the present invention. Communication port 460 can be any of an RS-232 port for use with a modem based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s). Mass storage 450 may be any current or future mass storage solution, which can be used to store information and/or instructions.

Bus 420 communicatively couples processor(s) 470 with the other memory, storage and communication blocks.

Optionally, operator and administrative interfaces, e.g. a display, keyboard, and a cursor control device, may also be coupled to bus 420 to support direct operator interaction with a computer system. Other operator and administrative interfaces can be provided through network connections connected through communication port 460. Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

Advantages of the Invention

The present disclosure provides higher spectral efficiency by allowing its antenna array to focus narrow beams towards a user.

The present disclosure provides higher energy efficiency system as the antenna array is focused in a small specific section, it requires less radiated power and reduces the energy requirement in massive MIMO systems.

The present disclosure increases data rate and capacity of wireless systems.

The present disclosure facilitates more reliable and accurate user tracking.

The present disclosure eliminates high power consumption.

The present disclosure reduces Latency and increases reliability of network.

The present disclosure provides a cable less design of Massive MIMO radio unit.

The present disclosure provides a Massive MIMO standalone unit placed in a single convection cooled enclosure and weighing less than 25-29 kg.

The present disclosure provides a Massive MIMO standalone unit that comprises of lower layer PHY section, ORAN compliant Fronthaul on 25G optical interface, Digital Front End support for 32 transmit and receive chains using commercial grade three FPGAs.

The present disclosure provides a Massive MIMO standalone unit that includes Integrated 8×8 MIMO antenna with 32 Cavity filter as a one unit known as Antenna Filter Unit (AFU).

We claim:

1. An antenna filter unit (AFU) (280), comprising:

a plurality of cavity filters; and a Multiple-Input-Multiple-Output (MIMO) antenna unit coupled to the plurality of cavity filters, wherein the AFU (280) is blind-mated to a radio frequency front end module (RFEM) (250) through a pole between respective connectors on the AFU (280) and the RFEM (250), and the pole functions as a transmission line and a pole-connector interface forms part of the AFU (280) to route transmit and receive signals to the cavity filters, the AFU (280) and the RFEM (250) are configured on a high speed transceiver board (HSTB) (200) along with the transmission line that is connected between two connectors as the pole, wherein the HSTB (200) comprises a plurality of transceivers, and wherein digital signals received from Combined Central and Distributed Unit (CCDU) are converted into radio frequency (RF) signals and processed into analog signals using one or more converters to be transmitted to the RFEM (250).

2. The AFU (280) as claimed in claim 1, wherein the AFU (280) comprises a calibration Printed Circuit Board (PCB).

3. The AFU (280) as claimed in claim 1, wherein the AFU (280) comprises one or more antenna ports as receiver and transmitter outputs, the one or more antenna ports being connected to respective cavity filters to achieve 32T32R configuration that provides steeper roll-off outside operating band.

4. The AFU (280) as claimed in claim 1, wherein the RFEM (250) comprises one or more low noise amplifiers (LNAs) and a plurality of RF switches for transmit and receive chains to process the received analog signals and transmit output signals to the AFU (280), wherein the AFU (280) is included as part of a single convection-cooled enclosure along with an 8×8 MIMO antenna.

5. The AFU (280) as claimed in claim 1, wherein the HSTB (200) is placed in a metal housing having a covering on a bottom side, wherein the AFU (280) is configured to be coupled to the metal housing from the bottom side, and wherein the metal housing is an aluminium metal housing.

6. A user equipment (UE) (302) communicatively coupled to a multiple input multiple output (MIMO) radio unit (100), the UE (302) comprising:

one or more primary processors communicatively coupled to one or more processors of the MIMO radio unit (100) through a network (304), the one or more primary processors coupled with a memory, wherein said memory stores instructions which when executed by the one or more primary processors cause the UE (302) to:

transmit one or more radio frequency (RF) control signals to the MIMO radio unit (100), wherein the MIMO radio unit (100) comprises an antenna filter unit (AFU) (280) having a plurality of cavity filters and a MIMO antenna unit, the AFU (280) is blind-mated to a radio frequency front end module (RFEM) (250) through a pole between respective connectors on the AFU (280) and the RFEM (250), and wherein the pole functions as a transmission line, and a pole-connector interface forms part of the AFU (280) to route transmit and receive signals to the cavity filters, wherein the AFU (280) and the RFEM (250) are configured on a high speed transceiver board (HSTB) (200) along with the transmission line that is connected between two connectors as a pole, wherein the HSTB (200) comprises a plurality of transceivers, and wherein digital signals received from Combined Central and Distributed Unit (CCDU) are converted into radio frequency (RF) signals and processed into analog signals using one or more converters to be transmitted to the RFEM (250).

7. A non-transitory computer readable medium comprising processor-executable instructions that cause a processor to:

transmit one or more radio frequency (RF) control signals to a multiple input multiple output (MIMO) radio unit (100), wherein the MIMO radio unit (100) comprises an antenna filter unit (AFU) (280) having a plurality of cavity filters and a MIMO antenna unit, the AFU (280) is blind-mated to a radio frequency front end module (RFEM) (250) through a pole between respective connectors on the AFU (280) and the RFEM (250), and wherein the pole functions as a transmission line, and a pole-connector interface forms part of the AFU (280) to route transmit and receive signals to the cavity filters, wherein the AFU (280) and the RFEM (250) are configured on a high speed transceiver board (HSTB) (200) along with the transmission line that is connected between two connectors as a pole, wherein the HSTB (200) comprises a plurality of transceivers, and wherein digital signals received from Combined Central and Distributed Unit (CCDU) are converted into radio frequency (RF) signals and processed into analog signals using one or more converters to be transmitted to the RFEM (250).

* * * * *